US 8,672,627 B2

(12) United States Patent
Yeh et al.

(10) Patent No.: US 8,672,627 B2
(45) Date of Patent: Mar. 18, 2014

(54) ON-BLADE ACTUATOR FOR HELICOPTER ROTOR BLADE CONTROL FLAPS

(75) Inventors: Jimmy Lih-Min Yeh, West Hartford, CT (US); Fanping Sun, Glastonbury, CT (US); Zaffir A. Chaudhry, South Glastonbury, CT (US); Robert H. Dold, Monson, MA (US); Ulf J. Jonsson, South Windsor, CT (US); Brian E. Wake, South Glastonbury, CT (US); Michael G. O'Callaghan, Manchester, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1646 days.

(21) Appl. No.: 11/638,798

(22) Filed: Dec. 14, 2006

(65) Prior Publication Data
US 2008/0145220 A1  Jun. 19, 2008

(51) Int. Cl.
*B64C 27/46* (2006.01)
(52) U.S. Cl.
USPC ............. 416/24; 416/146 R; 416/170 R
(58) Field of Classification Search
USPC ............. 416/23, 24, 146 R, 155, 170 R; 415/122.1; 244/76 A, 214, 215
See application file for complete search history.

(56) References Cited

U.S. PATENT DOCUMENTS

| | | | | |
|---|---|---|---|---|
| 2,426,488 | A * | 8/1947 | Davidson | 318/74 |
| 2,511,504 | A * | 6/1950 | Hawkins | 244/208 |
| 3,451,644 | A * | 6/1969 | Hugo et al. | 244/7 A |
| 3,795,375 | A * | 3/1974 | Lemnios | 244/17.27 |
| 5,387,083 | A * | 2/1995 | Larson et al. | 416/23 |
| 6,152,692 | A | 11/2000 | Aubry | |
| 6,513,762 | B2 * | 2/2003 | Fink et al. | 244/215 |
| 2006/0011777 | A1 * | 1/2006 | Arlton et al. | 244/7 B |

FOREIGN PATENT DOCUMENTS

| | | |
|---|---|---|
| JP | 08-156891 | 6/1996 |
| JP | 2001-080588 | 5/2001 |
| WO | 0183295 A1 | 11/2001 |

OTHER PUBLICATIONS

PCT International Search Report and Written Opinion, PCT/US2007/086587, dated Feb. 5, 2009.
European Search Report for European Patent Application No. 07875025.4 completed May 23, 2013.

* cited by examiner

*Primary Examiner* — Ninh H Nguyen
(74) *Attorney, Agent, or Firm* — Carlson, Gaskey & Olds P.C.

(57) ABSTRACT

A helicopter rotor blade having a blade body that defines a confined space and a control flap that is secured to the blade body that moves through a range of motion. An electric machine is secured inside of the rotor blade body that rotates a motor shaft. A transmission device is secured to the motor shaft and the control flap that transfers rotary motion of the motor shaft to the control flap to generate movement of the control flap through its range of motion. The transmission device remains substantially within the confined space throughout the range of motion.

10 Claims, 5 Drawing Sheets

ON-BLADE ACTUATOR FOR HELICOPTER ROTOR BLADE CONTROL FLAPS

BACKGROUND OF THE INVENTION

1. Field of the Invention

The present disclosure relates to helicopter rotor blades. More specifically, the present disclosure relates to an on-blade actuator for helicopter rotor blade control flaps.

2. Description of Related Art

The operation and performance of helicopter rotor blades is significant to the overall performance of a helicopter. The vertical lift and the forward and lateral movement of the helicopter are all made possible by the operation of the rotor blades. A swashplate located around the rotating shaft of a helicopter is conventionally used to mechanically control the movement of individual blades by producing their pitch for rotor thrust control (tilt of thrust and thrust magnitude). The traditional method for producing the pitch motion is by directly driving at the blade root via the swashplate. But, the swashplate is an extremely complex, very heavy and maintenance intensive mechanical system. The elimination of the swashplate can result in many benefits such as reduced empty weight and drag, and increased maintainability.

Recently, on-blade control flaps have been used on the main rotor blades of helicopters to reduce the required power of actuation by controlling the pitch motion and higher harmonics of the blades during flight. Instead of the swashplate, the control flaps are driven by an on-blade actuator that produces the pitch motion of the blades by directly driving at the flap. The control flaps deflect to induce a hinge moment on the blade via the aerodynamics of the air stream acting on the flap. This moment then generates the required pitch motion of the blade about the blade pitch axis with an order of magnitude that is less power than direct driving of the blade. The control flaps can be used for both primary flight control (PFC), as well as vibration reduction and acoustic noise reduction known as high harmonic control (HHC). The control flaps eliminate the need for a swashplate, swashplate linkages, main rotor servo flaps, pitch links, main rotor bifilar, and the associated hydraulic system. Unfortunately, prior art on-blade actuators have not proven effective at reducing power consumption to desired levels. Additionally, prior art on-blade actuators have proven to be very maintenance intensive.

Accordingly, there is need for on-blade actuation mechanisms that overcome, mitigate and/or alleviate one or more of the aforementioned and other deleterious effects of the prior art.

BRIEF SUMMARY OF THE INVENTION

The present disclosure provides a helicopter rotor blade having a blade body that defines a confined space and a control flap that is secured to the blade body that moves through a range of motion. An electric machine is secured inside of the rotor blade body that rotates a motor shaft. A transmission device is secured to the motor shaft and the control flap that transfers rotary motion of the motor shaft to the control flap to generate movement of the control flap through its range of motion. The transmission device remains substantially within the confined space throughout the range of motion.

The above-described and other features and advantages of the present disclosure will be appreciated and understood by those skilled in the art from the following detailed description, drawings, and appended claims.

DETAILED DESCRIPTION OF THE INVENTION

Figure 1:
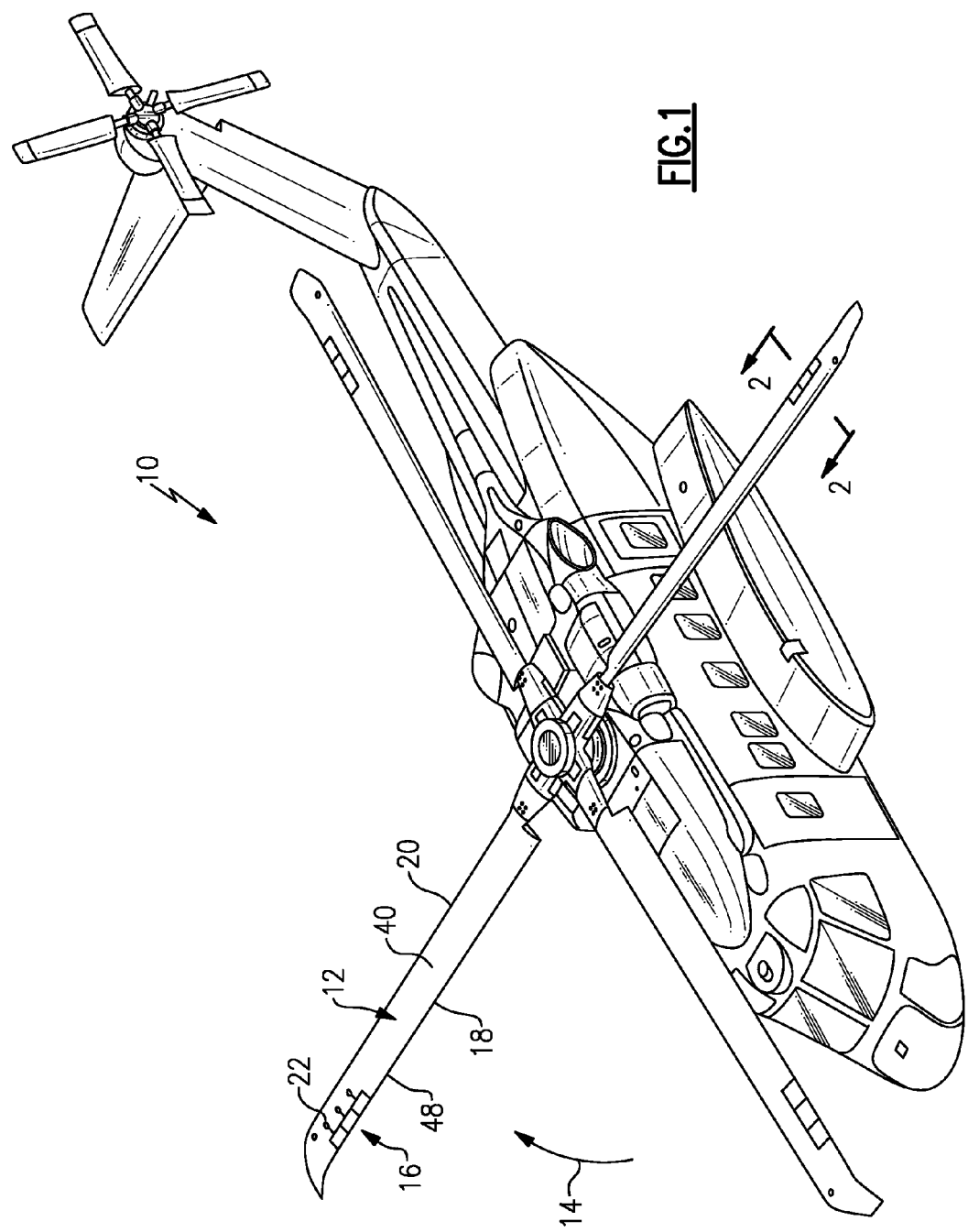
FIG. 1 illustrates a perspective view of a helicopter having rotor blades with control flaps that include an exemplary embodiment of an on-blade actuator according to the present disclosure.

Referring now to the drawings and in particular FIG. 1, a helicopter generally referred to by reference number 10 is shown. Helicopter 10 includes one or more rotor blades 12 configured for rotation in a rotor direction 14. Each rotor blade 12 has a blade body 40 and one or more control flaps (three shown) 16 disposed thereon.

In the illustrated embodiment, control flaps 16 are disposed on a trailing edge 18 of rotor blade 12. As used herein, the trailing edge 18 is defined as the edge of rotor blade 12 that follows or trails the movement of the rotor blade as the blade is rotated in the rotor direction 14. Of course, it is contemplated by the present disclosure for control flaps 16 to be disposed on a leading edge 20 of the rotor blade 12. Additionally, it is contemplated by the present disclosure for control flaps 16 to be disposed on any combination of the trailing and leading edges 18, 20, respectively.

In accordance with the principles of the present disclosure, the pitch of each control flap 16 is controlled by an actuator 22 on board each rotor blade 12, namely within body 40 of the rotor blade. In this manner and when used on the trailing edge 18, control flaps 16 can be used to replace the swashplate of the prior art. Further, when used on the leading edge 20, control flaps 16 can be used to impart enhanced performance by delaying retreating blade stall.

Advantageously, actuator 22 is configured to rotate control flaps 16, but is sufficiently compact to fit into a confined space 48 defined by the exterior shape of rotor blade 12. In this manner, actuator 22 minimizes and/or eliminates any portion of the actuator from protruding from confined space 48 during use so that the actuator does not effect the aerodynamics of rotor blade 12, which enhances the effect of control flaps 16 on the airstream.

Figure 2:
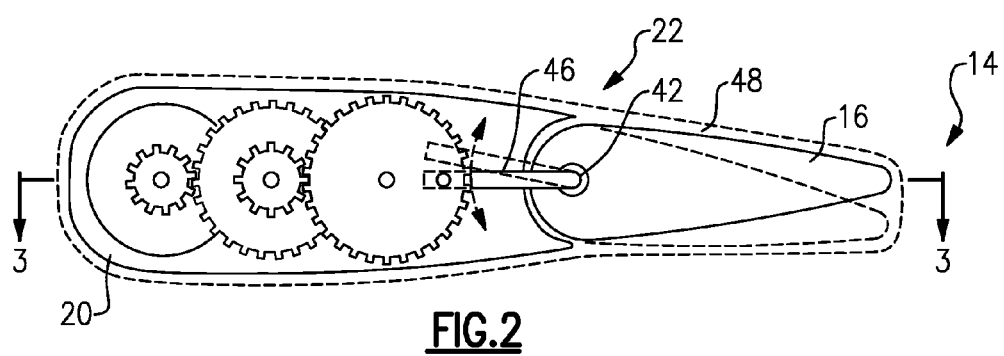
FIG. 2 is a sectional view of a rotor blade taken along lines 2-2 of FIG. 1 illustrating a first exemplary embodiment of the on-blade actuator.

Referring now to FIG. 2, an exemplary embodiment of actuator 22 according to the present disclosure is shown. Actuator 22 includes an electric machine 24 and a transmission device 28 that couples the motion and torque generated by electric machine 24 and transmits it to control flap 16. Transmission device 28 is connected to control flap 16 via a rigid connector 42. In a preferred embodiment, electric machine 24 is a direct current brushless motor and transmission device 28 is a three-stage gear train 26 with a swing arm 46 that converts forward and backward rotary motion from gear train 26 into forward and backward movement of control flap 16 about an axis 64. Gear train 26 is housed in a gear case 44.

Actuator 22 is mounted within rotor blade body 40 so that the mass or weight of the actuator is centered proximate to the leading edge 20 of rotor blade 12.

Figure 3:
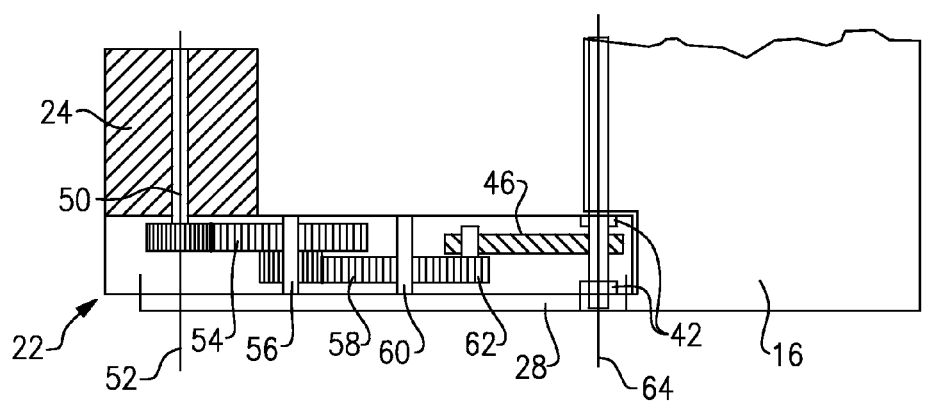
FIG. 3 is a sectional view of the first exemplary embodiment of the on-blade actuator taken along lines 3-3 of FIG. 2.

Referring now to FIG. 3, a sectional view of actuator 22 according to the present disclosure is shown, taken along lines 3-3 of FIG. 2. Actuator 22 has a motor shaft 50 that is rotated by electric machine 24 along an axis of rotation 52. Transmission device 28 transmits the rotary motion from shaft 50 to control flap 16.

In the illustrated embodiment, transmission device 28 includes a first stage 54, a first transmission shaft 56, a second stage 58, a second transmission shaft 60, a third stage 62, and a swing arm, 46. Motor shaft 50 rotates first stage 54 of transmission device 28. Transmission shaft 56 converts motion from first stage 54 of transmission device 28 to second stage 58 of the transmission device. Second transmission shaft 60 converts motion from second stage 58 of transmission device 28 to the third stage 62 of the transmission device. Swing arm 46 transfers the motion from third stage 62 of transmission device 28 to control flap 16, so that the control flap rotates about an axis of rotation 64 of control flap 16. Swing arm 46 is connected to control flap 16 via rigid connector 42.

In the illustrated embodiment, the axis of rotation 52 of motor shaft 50 is parallel to the axis of rotation 64 of control flap 16. Of course, it is contemplated by the present disclosure for transmission device 28 to be configured so that axes of rotation 52, 64 are angled (i.e., not parallel) to one another.

Accordingly, actuator 22 maintains electric machine 24 and transmission device 28 substantially within confined space 48 and, preferably, entirely within the confined space, during the complete range of motion of control flap 16.

Figure 4:
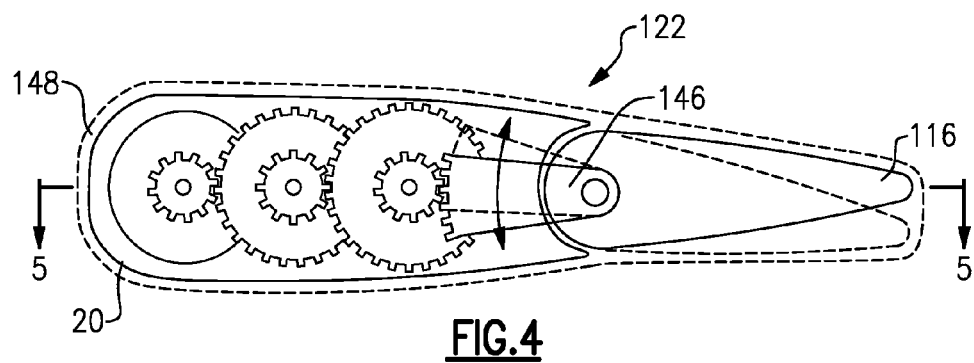
FIG. 4 is a sectional view of a rotor blade illustrating a second exemplary embodiment of the on-blade actuator.

Referring now to FIG. 4, a second exemplary embodiment of actuator 122 according to the present disclosure is shown in which component parts performing similar or analogous functions are labeled in multiples of one hundred. In a preferred embodiment of actuator 122, transmission device 128 is a three-stage gear train 126 with a sector gear 146 that converts forward and backward rotary motion from gear train 126 into forward and backward movement of control flap 116 about an axis 164.

Advantageously, actuator 122 is configured to rotate control flaps 116, but is sufficiently compact to fit into a confined space 148 defined by the exterior shape of rotor blade 112. In this manner, actuator 122 minimizes and/or eliminates any portion of the actuator from protruding from confined space 148 during use so that the actuator does not effect the aerodynamics of rotor blade 112, which enhances the effect of control flaps 116 on the airstream.

Figure 5:
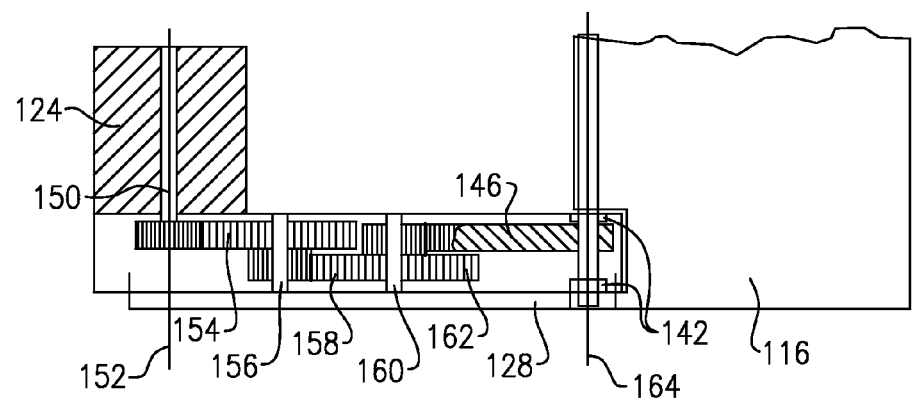
FIG. 5 is a sectional view of the second exemplary embodiment of the on-blade actuator taken along lines 5-5 of FIG. 4.

Referring now to FIG. 5, a sectional view of actuator 122 taken along lines 5-5 of FIG. 4 is shown. Actuator 122 has a motor shaft 150 that transmits a rotational motion generated from electric machine 124 along an axis of rotation 152 to a first stage 154 of transmission device 128. A transmission shaft 156 converts motion from first stage 154 of transmission device 128 to a second stage 158 of transmission device 128. A second transmission shaft 160 converts motion from second stage 158 of transmission device 128 to a third stage 162 of transmission device 128. Sector gear 146 transfers the motion from the third stage 162 of transmission device 128 to control flap 116 so that the control flap rotates about an axis of rotation 164. Sector gear 146 is connected to control flap 116 via a rigid connector 142. The axis of rotation 152 of motor shaft 150 is parallel to the axis of rotation of 164 of control flap 116.

Figure 6:
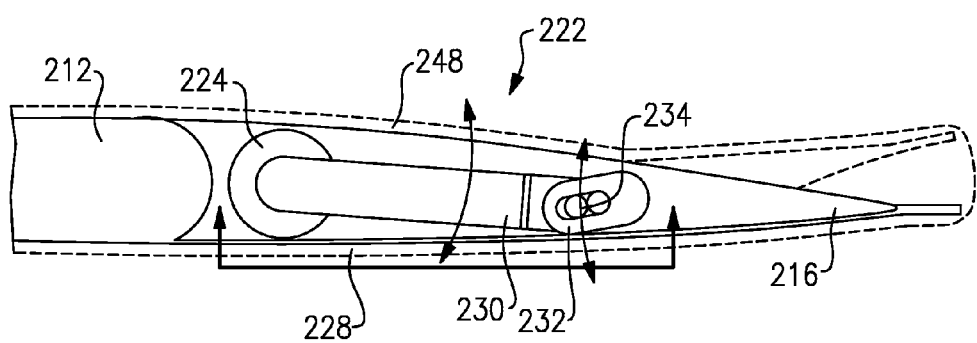
FIG. 6 is a sectional view of a rotor blade illustrating a third exemplary embodiment of an on-blade actuator according to the present disclosure.

Referring now to FIG. 6, a third exemplary embodiment of actuator 222 according to the present disclosure is shown in which component parts performing similar or analogous functions are labeled in multiples of two hundred. In a preferred embodiment, electric machine 224 is a direct current brushless motor and transmission device 228 includes a first lever 230 and a second lever 232. First lever 230 is secured to the shaft (not shown) of electric machine 224 so that the electric machine can rotate the first lever. First and second levers 230, 232 are coupled to one another by a sliding pin-slot mechanism 234. Second lever 232 is rigidly secured to control flap 216. Mechanism 234 is configured to convert the motion of first lever 230 into a rotary motion of second lever 232 so that the second lever rotates control flap 216.

Advantageously, actuator 222 is configured to rotate control flaps 216, but is sufficiently compact to fit into a confined space 248 defined by the exterior shape of rotor blade 212. In this manner, actuator 222 minimizes and/or eliminates any portion of the actuator from protruding from confined space 248 during use so that the actuator does not effect the aerodynamics of rotor blade 212, which enhances the effect of control flaps 216 on the airstream.

Figure 7:
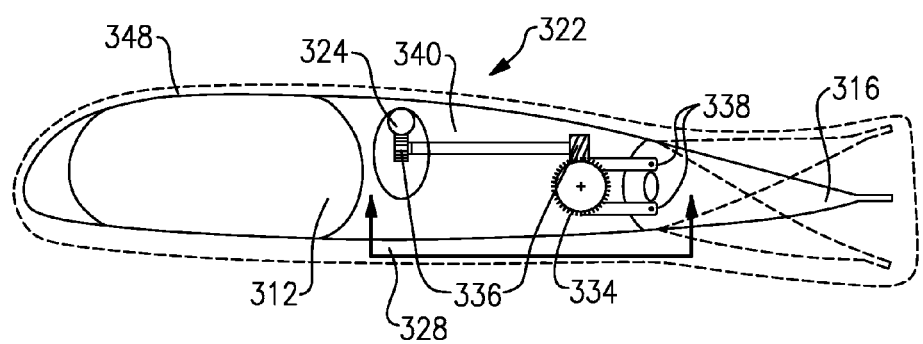
FIG. 7 is a sectional view of a rotor blade illustrating a fourth exemplary embodiment of an on-blade actuator according to the present disclosure.

Referring now to FIG. 7, a fourth exemplary embodiment of actuator 322 according to the present disclosure is shown in which component parts performing similar or analogous functions are labeled in multiples of three hundred. In a preferred embodiment, electric machine 324 is a direct current brushless motor and transmission device 328 includes a worm gear set 334 and a pair of bevel gears 336. Worm gear set 334 steps down the speed and amplifies the torque of the rotary motion generated by motor 324. The motion generated by transmission device 328 is transferred to control flap 316 through bevel gears 336. In this particular configuration, worm gear set 334 is located in blade body 340 ahead of control flap 316. Actuator 322 also includes a pair of links 338 connecting worm gear set 334 to control flap 316 so that motion from motor 324 is transmitted to control flap 316.

Advantageously, actuator 322 is configured to rotate control flaps 316, but is sufficiently compact to fit into a confined space 348 defined by the exterior shape of rotor blade 312. In this manner, actuator 322 minimizes and/or eliminates any portion of the actuator from protruding from confined space 348 during use so that the actuator does not effect the aerodynamics of rotor blade 312, which enhances the effect of control flaps 316 on the airstream.

Figure 8:
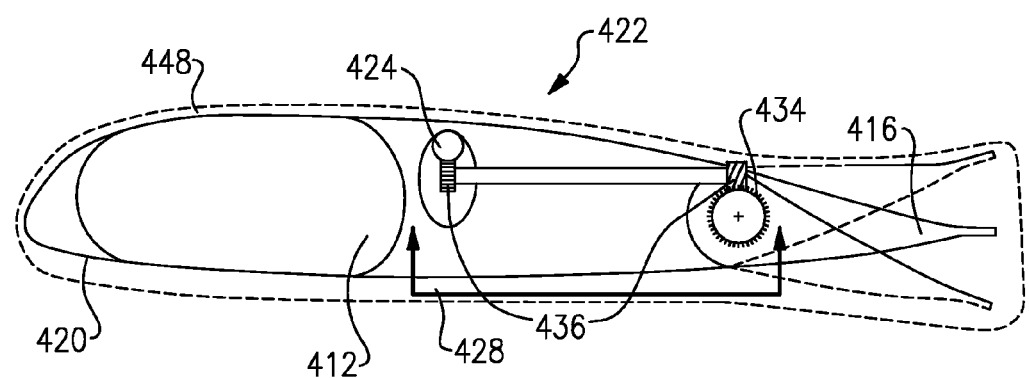
FIG. 8 is a sectional view of a rotor blade illustrating a fifth exemplary embodiment of an on-blade actuator according to the present disclosure.

Referring now to FIG. 8, a fifth exemplary embodiment of actuator 422 according to the present disclosure is shown in which component parts performing similar or analogous functions are labeled in multiples of four hundred. In a preferred embodiment, transmission device 428 includes a worm gear set 434 and a pair of bevel gears 436 where worm gear 434 is aligned with the rotational axis of control flap 416. Thus, there is no additional connection mechanism necessary because transmission device 428 is capable of transmitting the rotary motion generated by electric machine 424 directly to control flap 416. The configuration of actuator 422 is especially advantageous because worm gear 436 is located closer to the leading edge 420 of rotor blade 412 which counters the center of gravity, reduces drag and improves the effectiveness of torque and motion transmission.

Advantageously, actuator 422 is configured to rotate control flaps 416, but is sufficiently compact to fit into a confined space 448 defined by the exterior shape of rotor blade 412. In this manner, actuator 422 minimizes and/or eliminates any portion of the actuator from protruding from confined space 448 during use so that the actuator does not effect the aerodynamics of rotor blade 412, which enhances the effect of control flaps 416 on the airstream.

Each of the aforementioned embodiments and their alternate configurations feature a very small profile, a simple design and a high efficiency in motion and torque transmission. Actuators 22, 122, 222, 322, and 422 are tailored to fit into the confined space defined by the rotor blade body. Each transmission device uses either a gear or a linkage mechanism that operates at an optimal angle of transmission such that maximum efficiency is achieved. It has been determined by the present disclosure that the simple gear train mechanism and the linkage mechanism are reliable and require low maintenance.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A helicopter rotor blade comprising:
   a blade body which defines a confined space;
   a control flap rotatably secured to said blade body for movement through a range of motion defined about a control flap axis of rotation;
   a direct current brushless motor secured in said blade body that rotates a motor shaft; and
   a transmission device secured to said motor shaft and said control flap, said transmission device operable to transfer rotary motion of said direct current brushless motor about a motor shaft axis of rotation parallel to said control flap axis of rotation to said control flap for movement through said range of motion, said transmission device remains entirely within said confined space throughout said range of motion, said transmission device comprises a worm gear set and a pair of bevel gears, said worm gear set connected to said control flap to pitch said control flap through said range of motion.

2. The helicopter rotor blade of claim 1, wherein said transmission device comprises a three-stage gear train with a swing arm connected to said control flap to pitch said control flap through said range of motion.

3. The helicopter rotor blade of claim 1, wherein said transmission device comprises a three-stage gear train with a sector gear connected to said control flap to pitch said control flap through said range of motion.

4. The helicopter rotor blade of claim 1, wherein said transmission device comprises a pair of levers coupled by a sliding pin-slot mechanism.

5. The helicopter rotor blade of claim 1, wherein said worm gear set is located in said rotor blade body ahead of said control flap.

6. The helicopter rotor blade of claim 5, further comprising a pair of links that connect said worm gear set to said control flap.

7. The helicopter rotor blade of claim 1, wherein said worm gear set is aligned with a rotational axis of said control flap such that a worm gear of said worm gear set rotates about a worm gear axis parallel to control flap axis of rotation.

8. The helicopter rotor blade of claim 7, wherein said worm gear set transfers the rotary motion of said motor shaft directly to said control flap.

9. The helicopter rotor blade of claim 1, wherein said control flap is disposed on said trailing edge of said rotor blade.

10. The helicopter rotor blade of claim 1, wherein said control flap is disposed on said leading edge of said rotor blade.

* * * * *